United States Patent [19]

Engelsdorf et al.

[11] Patent Number: 5,161,774
[45] Date of Patent: Nov. 10, 1992

[54] MICROVALVE

[75] Inventors: Kurt Engelsdorf, Besigheim; Michael Mettner, Ludwigsburg, both of Fed. Rep. of Germany

[73] Assignee: Robert Bosch GmbH, Stuttgart, Fed. Rep. of Germany

[21] Appl. No.: 773,900

[22] PCT Filed: May 17, 1990

[86] PCT No.: PCT/DE90/00366
§ 371 Date: Oct. 29, 1991
§ 102(e) Date: Oct. 29, 1991

[87] PCT Pub. No.: WO90/15933
PCT Pub. Date: Dec. 27, 1990

[30] Foreign Application Priority Data

Jun. 19, 1989 [DE] Fed. Rep. of Germany ....... 3919876

[51] Int. Cl.⁵ .................................................. F16K 31/02
[52] U.S. Cl. .................................. 251/11; 251/129.06; 251/129.01; 251/331; 251/129.07
[58] Field of Search .............. 251/129.01, 331, 282, 251/129.06, 11, 129.07

[56] References Cited

U.S. PATENT DOCUMENTS 4,826,121  5/1989  Mikkor ........................ 251/129.17

FOREIGN PATENT DOCUMENTS 0250948  1/1988  European Pat. Off. .
0261972  3/1988  European Pat. Off. .
2155152  9/1985  United Kingdom .

Primary Examiner—Arnold Rosenthal
Attorney, Agent, or Firm—Michael J. Striker

[57] ABSTRACT

A microvalve has at least two pressurized-medium connections means forming a valve seat between the connections, a closure member cooperating with the valve seat, an electrical actuating unit deflecting the closure member, and a membrane which moves the closure member in opposition to he electrical actuating unit and adjoins a space which can be loaded with pressurized medium. The membrane has an area which is substantially reduced relative to the valve seat and is firmly joined to the membrane and also has a pressure-loaded area. The closure member has a ring-shaped pressure-compensation area which is opposite to the membrane and extends radially outwardly of the reduced surface of the membrane and counteracts the pressure loaded area of the membrane, the pressure-loaded area of the membrane and the pressure-compensation area of the closure member are essentially equally large.

22 Claims, 2 Drawing Sheets

MICROVALVE

BACKGROUND OF THE INVENTION

The invention relates to a microvalve. More particularly it relates to a microvalve which has pressurized-medium connections and a valve seat inserted between them with which a closure member is associated and is deflectable by electrical actuating means.

GB 2,155,152 A has already disclosed such a microvalve which is produced in the multilayer structure known from semiconductor technology. This micromechanical valve has essentially three layers, of which an inlet and an outlet, and also a valve seat are constructed in a silicon base layer and an intermediate layer adjoins said base layer and also an outer covering layer adjoins the latter. The layers form a space producing the pressurised-medium link between the two connections. In this microvalve, the covering layer is at the same time constructed as a membrane into which a closure member belonging to the valve seat is integrated. When this microvalve is operated, an electrostatic actuating device disposed on the membrane has to overcome not only the forces of the resilient membrane but also the fluid pressure present in the inlet since the membrane which closes the valve seat is not compensated with respect to this pressure. The result of this is that the microvalve is suitable only for relatively low pressures and consequently produces a relatively low hydraulic switching power. The dynamic behaviour of the micromechanical valve is consequently also adversely affected. The non-pressure-compensated construction of the microvalve results, in addition, in relatively large actuating forces and consequently in relatively expensive actuating devices.

Reference is furthermore made to the publications EP 0,250,948 A2 and EP 0,261,972 A2 in which the technology of producing such microvalves is described more precisely and it is explained how three-dimensional shapes can be machined in multilayer structures so that different mechanical elements are possible as a result of combining different structural details. The microvalve can consequently be constructed as a 2- or 3-way valve. The membrane can also be disposed in an intermediate layer.

SUMMARY OF THE INVENTION

Accordingly, it is an object of the present invention to provide a microvalve which avoids the disadvantages of the prior art and is a further improvement.

In keeping with these objects and with others which will become apparent hereinafter, one feature of the present invention resides, briefly stated, in a microvalve of the above mentioned type in which a pressure-compensating area acting opposition to a pressure-loaded membrane is disposed in a spa at a closure member firmly joined to the membrane.

When the microvalve is designed in accordance with the present invention it has the advantage that it makes possible a statically pressure-compensated construction of the microvalve in a relatively simple and inexpensive way. As a result of this pressure-compensated construction, higher pressures can be controlled or lower actuating forces can be employed. The fluidic power of the microvalve consequently increases appreciably, it also being possible to achieve high dynamics since only relatively small masses have to be moved. This pressure-compensated construction is suitable, in particular, for production with micromechanical technologies so that, in addition to low unit costs, a high-precision manufacture and reproducibility of the parts is possible even with small dimensions. The construction of the microvalve can be ideally tailored to the possibilities of the different micromechanical manufacturing technologies. Furthermore, such microvalves can be interconnected as desired and can also be combined to form so-called valve series.

The pressure loaded area of the membrane and the pressure-compensating area can be essentially equally large. The size of the pressure-compensating area can be limited by the valve seat. The diameter of the valve seat can correspond approximately to the effective diameter of the membrane. These features make various directions of movement of the closure member, it being possible for the closure member to open both in the flow direction and also against the flow direction, and also various types of electrical actuation.

The area and the closure member loaded by the pressure in the outlet connection can be at least approximately as large as the area at the ring membrane loaded by the pressure in the recess and determined by the effective diameter of the membrane. This embodiment, as a result of which a pressure compensation can be achieved not only on the inlet side but also on the outlet side is extremely beneficial. In accordance with another embodiment of the present invention, the movable component of the microvalve can be formed as a double annular membrane. This embodiment which is particularly well suited for both flow directions, is furthermore advantageous. A drive in both directions can be achieved. When the actuating means are disposed symmetrically above and below the movable component with double annular membrane as a result of which power and dynamics can be increased further.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
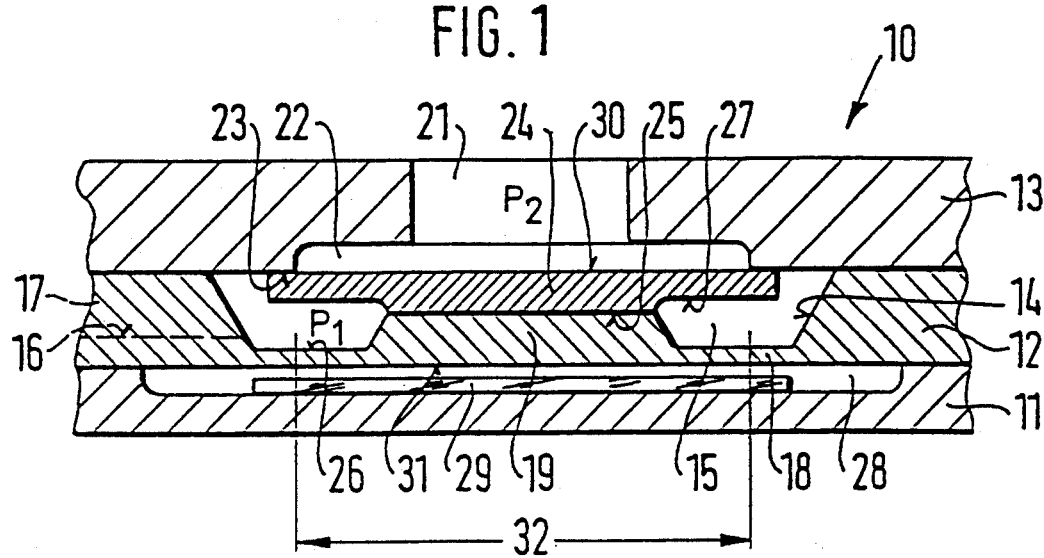
FIG. 1 shows a longitudinal section through a microvalve in a simplified representation and on an enlarged scale.

FIG. 1 shows a longitudinal section through a single microvalve 10 with a multilayer structure in a considerably enlarged and simplified representation, the individual layers being built up from different materials. At the same time, manufacturing technologies are used for the production of this multilayer structure such as are known per se from semiconductor technology, in particular under the name of silicon technology, thin-film technology or thick-film technology. These technologies for producing certain three-dimensional shapes in a multilayer structure and their potential for constructing mechanical elements determined by structural details are here assumed to be known.

The microvalve 10 has essentially a base layer 11, an intermediate layer 12 and a covering layer 13. At the same time, an annular space 15 which is bounded in the upward direction by the covering layer 13 and communicates with an inlet connection 17 via a channel 16 running in the intermediate layer 12 is formed in the intermediate layer 12 by a recess 14 in the form of an annular groove. The relatively thin-walled base of the recess 14 forms a resilient annular membrane 18 which surrounds a centrally situated layer region 19 which is thick compared with the latter. The annular membrane 18 is consequently integrated into the intermediate layer 12 and bounded by the space 15 formed by the recess 14.

The covering layer 13 has an outlet connection 21 which expands in the inward direction to form a shallow, disc-shaped recess 22. The recess 22 forms an annular valve seat 23 on the side facing the intermediate layer 12. In the unactuated position of the microvalve 10 shown, a plate-type closure member 24 which is attached to the layer region 19 by an area 25 which is substantially reduced compared with the diameter of the valve seat 23 rests against the valve seat 23. At the same time, the plate-type closure member 24 consists of a layer additional to the intermediate layer 12 and made of the same or different material. In this connection, the thicknesses of the layer region 19 and the closure member 24 are so chosen that together they correspond to the thickness of the intermediate layer 12.

With this construction of the microvalve 10, the movable component consisting of the annular membrane 18, the layer region 19 and the closure member 24 has a pressure area 26 whose size is essentially determined by the size of the ring membrane 18. At the same time, on the movable component 18, 19, 24 a pressure compensation area 27 is provided. The pressure compensation are loaded in the opposite direction and its size is limited, on the one hand, by the valve seat 23 and, on the other hand, by the area 25. These two areas 26 and 27 are matched to one another in such a way that they are essentially equally large.

An area 30 on top of the plate-type closure member 24 and loaded with the return pressure p2 is limited by the valve seat 23. An area 31 on the bottom of the movable component 18, 19, 24, which area is loaded with the pressure p0, is determined by the effective diameter 32 of the annular membrane 18.

For as complete as possible a pressure compensation at the movable component 18, 19, 24, the areas 30 and 31 must be essentially equally large. This assumes that the pressures p0 beneath and p2 above the movable component are essentially equally large. The spaces 22 above and 28 beneath the movable component 18, 19, 24 do not, however, necessarily have to contain the same medium: for example, the space 22 may contain a liquid, whereas the space 28 is filled with air, under which circumstances ambient pressure may prevail in both spaces so that p0 is essentially equal to p2.

Disposed in the base layer 11 in a shallow recess 28 facing the intermediate layer 12 is an electrode 29. It serves as electrical actuating means for the closure member 24 and, in addition, forms an electrostatically acting drive.

The mode or operation of the microvalve 10 is explained as follows: the pressurised medium flowing in from an inlet connection 17 not shown in more detail via the channel 16 reaches, with the microvalve 10 not actuated, the space 15 in which the inlet pressure can build up correspondingly. This pressure in the space 15 acts, on the one hand, downwards on the pressure area 26 at the membrane 18 and simultaneously on the annular pressure-compensation area 27 at the closure member 24. Since these two pressure areas 26, 27 are constructed so as to be substantially equally large, the movable component 18, 19, 24 is correspondingly statically pressure-compensated. Under the influence of the restoring force of the resilient annular member 18, the closure member 24 is in close contact with the valve seat 23 and blocks the link to the outlet connection 21. This restoring force of the annular membrane 18 may be very small as a consequence of the pressure-compensated construction of the microvalve 10.

To open the microvalve 10, the electrode 29 is connected to voltage. As a result, an electrostatic drive for the movable component 19, 24 acts in a manner known per se and the closure member 24 moves downwards, in which process it is lifted off the valve seat 23. Pressurised medium can now flow out of the space 15 to the outlet connection 21.

To close the microvalve 10, the electrostatic drive 29 is switched off. As a result, the closure member 24 again rests on the valve seat 23 under the influence of the restoring force of the resilient annular membrane 18 and consequently blocks the pressurised-medium link. At the same time, it is assumed that the pressures p2 and p0 on the areas 30 and 31 respectively are essentially equally large and consequently a pressure compensation also exists in relation to the said areas.

As a result of the pressure-compensated construction of the microvalve 10, it is possible that pressures substantially higher than hitherto can now be controlled and that a relatively weak, and consequently inexpensive and space-saving drive can be used as electrical actuating means. The microvalve 10 is therefore suitable for controlling substantially larger hydraulic or pneumatic pressures and, in addition, makes higher dynamics possible. At the same time, the pressure-compensation area 31 can also be matched relative to the size of the pressure area 30 in such a way that only a partial pressure compensation is achieved. The pressure areas 30, 31 can also be matched to one another in such a way that, in addition to the residual static pressure forces, dynamic forces resulting from the flow can also be allowed for and affect the switching behaviour of the microvalve 10.

Figure 2:
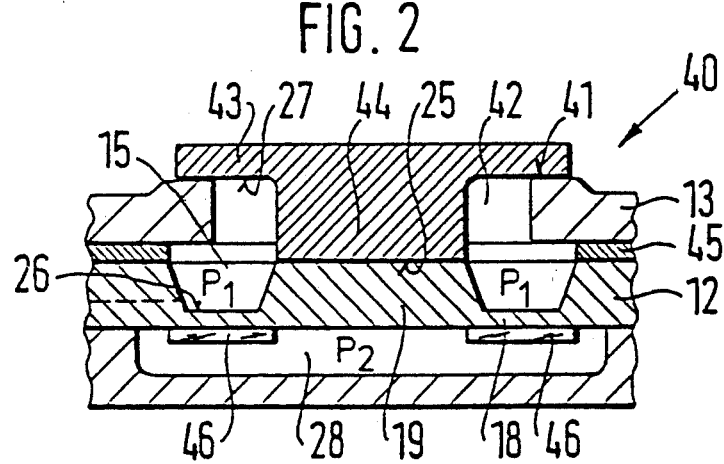
FIGS. 2 to 5 show a second to fifth exemplary embodiment of a microvalve.

FIG. 2 shows a second microvalve 40 which differs from the microvalve 10 according to FIG. 1 as follows, identical reference symbols being used for identical components.

In the second microvalve 40, the valve seat 41 is disposed at the outside of the cover plate 13, that is to say downstream of the opening 42 in the cover plate 13. The closure member 43 has a stud-type section 44 which corresponds to the area 25 and by means of which it passes through the opening 42 and is firmly joined at the central layer region 19 of the intermediate layer 12. The thickness of the central layer region 19 may at the same time be as large as the thickness of the intermediate layer 12. The intermediate layer 12 and the covering layer 13 are furthermore held at a distance from one another by an additional separating layer 45. An annular piezoelectric coating 46 is provided inside the recess 28 on the ring membrane 18 as electrical actuating means for the closure member 43. In the second microvalve 40, on the one hand, the pressure area 26 at the ring membrane 18 and, on the other hand, the pressure-compensation area 27 at the closure member 43 and the areas 30 and 31 are constructed for a static pressure compensation at the movable component, and the space 15 is filled with pressurised medium extending from the intermediate layer 12 through the separating layer 45 and the covering layer 13.

The mode of operation of the second microvalve 40 corresponds in principle to that of the first microvalve 10. The annular membrane 18 is actuated upwards, however, by the piezoelectric coating 46 and the closure member 43 consequently is opened in the flow direction. If the same pressure exists in the recess 28 in this valve construction as the pressure in the outlet, that is to say downstream of valve seat 41, the movable component consisting of annular membrane 18, layer region 19 and closure member 43 is essentially pressure-compensated with respect to the pressures in the inlet and also in the outlet.

Figure 3:
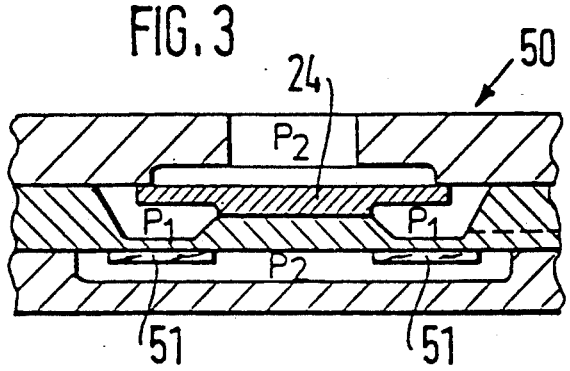

FIG. 3 shows a longitudinal section through a third microvalve 50 which differs from the first microvalve 10 only in that a thermoelectric coating 51 which is provided inside the recess 28 in the region of the ring membrane 18 at the intermediate layer 12 is provided as electrical actuating means. The closure member 24 can consequently be actuated in the same direction of movement as in the case of the first microvalve 10, namely downwards from the starting position shown.

Figure 4:
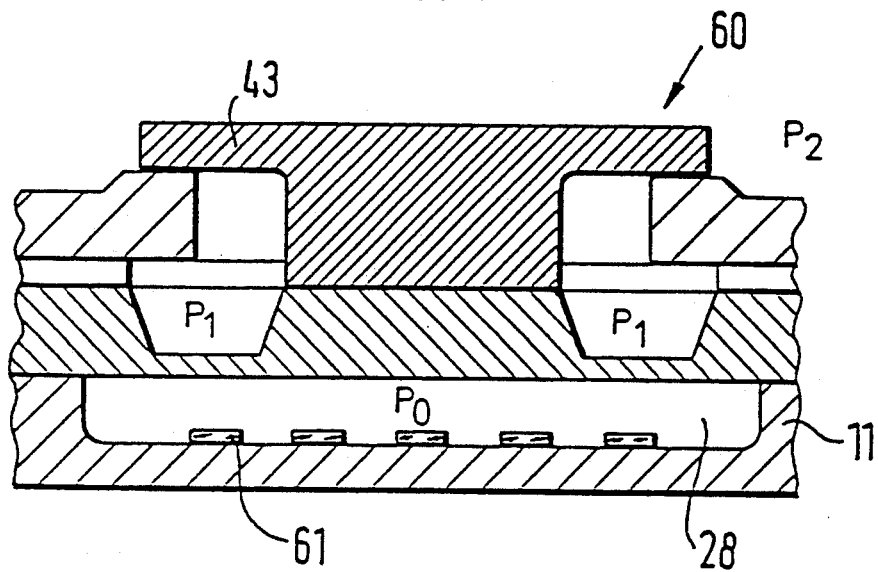

FIG. 4 shows a fourth microvalve 60 which differs from the second microvalve 40 shown in FIG. 2 in that a thermofluidic actuation is provided instead of the piezoelectric actuation. For this purpose, there is applied in the recess 28 of the base layer 11 a heating resistance 61 which heats up when an electric current flows through it. In this process, it heats up the fluid (liquid or gas) enclosed in the recess 28 so that the latter expands. As a consequence of the increase in pressure caused thereby in the recess 28, the annular membrane 18 is deflected upwards and the closure member 43 opens in the flow direction.

Figure 5:
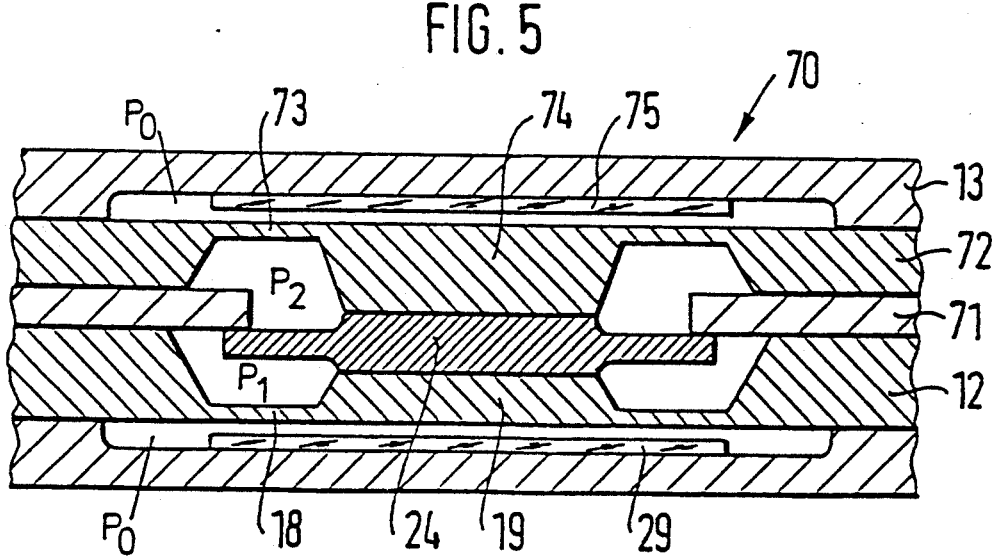

FIG. 5 shows a fifth microvalve 70 which differs from the microvalve 10 shown in FIG. 1 in that both the annular membrane and the electrical actuating device are present in duplicate. It contains two additional intermediate layers 71 and 72. The movable component 19, 24 from FIG. 1 is linked via a further central layer region 74 to a second annular membrane 73 which is constructed in the intermediate layer 72. Provided above the movable component 19, 24, 74 in the covering layer 13 is a further electrical actuation 75 which is constructed in the same way as the electrical actuation 29 underneath the first annular membrane 18. This achieves a completely symmetrical construction of the microvalve 70. In particular, a complete pressure compensation is ensured at the movable component 19, 24, 74 in this construction even if the pressures p0 and p2 differ fairly considerably from one another.

In the case of the microvalve 10, it is assumed on the other hand, that the possible difference between p0 and p2 is small, which may possibly not be guaranteed in every application case.

The electrical actuating means 75 or 29, respectively, present above or below the movable component 19, 24, 74 has, in addition, the advantage that the valve can be both opened and closed by electrical actuation. In the case of the microvalve 10, on the other hand, closure takes place as a result of the resilient restoring action of the annular membrane 18.

It will be understood that each of the elements described above, or two or more together, may also find a useful application in other types of constructions differing from the types described above.

While the invention has been illustrated and described as embodied in a microvalve with multilayer structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A microvalve, comprising at least two pressurized-medium connections; means forming a valve seat between said connections; a closure member cooperating with said valve seat; electrical actuating means deflecting said closure member; and a membrane which moves said closure member in opposition to said electrical actuating means and adjoins a space which can be loaded with pressurized medium, said membrane having an area which is substantially reduced relative to said valve seat and is firmly joined to said membrane and also having a pressure-loaded area, said closure member having a ring-shaped pressure-compensation area which is opposite to said membrane and extends radially outwardly of said reduced surface of said membrane and counteracts said pressure loaded area of said membrane, said pressure loaded area of said membrane and said pressure-compensation area of said closure member being essentially equally large.

2. A microvalve as defined in claim 1, wherein said valve seat has a lateral extension which substantially corresponds to a lateral extension of said membrane.

3. A microvalve as defined in claim 1; and further comprising means forming a recess, said connections including another connection which is not connected with said space loaded with a pressurized medium said closure member having an area which is loaded by a pressure in said another connection and located opposite to said pressure-compensation area, said membrane having a surface which is loaded with a pressure acting in said recess and determined by an effective lateral extension of said membrane, said surface loaded by a pressure in said another connection being substantially equally large to said surface which is loaded by a pressure in said recess.

4. A microvalve as defined in claim 1, wherein said valve seat, said closure member, said membrane are formed in a plurality of layers; and further comprising a base layer, said plurality of layers including an intermediate layer in which said membrane is formed and which is arranged on said base layer, said layers also having a covering layer in which said valve seat is formed and which is arranged on said intermediate layer at its side opposite to said base layer.

5. A microvalve as defined in claim 1, wherein said membrane is formed as a resilient annular membrane.

6. A microvalve as defined in claim 5; and further comprising an intermediate layer, and an additional layer, said intermediate layer having a ring groove-shaped recess which forms said space loaded with pressurized medium, said intermediate layer forming said membrane in the region of said recess and also having a thicker central layer region, said closure member being provided in said additional layer and formed as substantially load-tight platelette.

7. A microvalve as defined in claim 4; and further comprising an intermediate layer, said membrane and said closure member extending together within a thickness of said intermediate layer.

8. A microvalve as defined in claim 7; and further comprising a covering layer arranged on said intermediate layer and forming said valve seat.

9. A microvalve as defined in claim 4, wherein said valve seat is formed at an outer side of said covering layer, said closure member extending through said covering layer.

10. A microvalve as defined in claim 1, wherein said membrane constitutes a movable component, said movable component having a double annular membrane.

11. A microvalve as defined in claim 10; and further comprising two intermediate layers which form said double annular membrane and said layer regions, and another intermediate layer which forms said valve seat and is located between said first mentioned intermediate layers, said closure member being arranged between central layer regions of said first mentioned intermediate layers.

12. A microvalve as defined in claim 10, wherein said actuating means are located symmetrically above and below said double annular membrane.

13. A microvalve as defined in claim 1, wherein said actuating means is formed as a piezoelectrically operating coating on said membrane.

14. A microvalve as defined in claim 1, wherein said actuating means is formed as a thermoelectrically operating coating on said membrane.

15. A microvalve as defined in claim 1; and further comprising a base layer on which said membrane is arranged, said actuating means including an electrode arranged in said base layer for electrostatically attracting said membrane.

16. A microvalve as defined in claim 1; and further comprising a base layer on which said membrane is arranged, said actuating means including a heat resistance arranged on said base layer for thermofluidically deflecting said membrane.

17. A microvalve as defined in claim 1, wherein said connections include an inlet connection, said space being connected with said inlet connection.

18. A microvalve as defined in claim 1, wherein said valve seat, said closing member, said membrane are formed as a silicon-technology produced multilayer structure.

19. A microvalve as defined in claim 1, wherein said valve seat, said closing member, said membrane are formed as a thin-film technology produced multilayer structure.

20. A microvalve as defined in claim 1, wherein said valve seat, said closing member, said membrane are formed as a thick-film technology produced multilayer structure.

21. A microvalve as defined in claim 1, wherein said microvalve is formed as a fuel injection valve.

22. A microvalve as defined in claim 1, wherein said microvalve is formed as a servovalve.

* * * * *